(12) United States Patent
Park

(10) Patent No.: US 7,480,219 B2
(45) Date of Patent: Jan. 20, 2009

(54) METHOD AND APPARATUS FOR CALCULATING A VARIATION PER TRACK OF A FOCUS ERROR TO CONTROL THE TILT OF A DISK

(75) Inventor: Sang On Park, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 118 days.

(21) Appl. No.: 09/989,414

(22) Filed: Nov. 21, 2001

(65) Prior Publication Data

US 2002/0060964 A1 May 23, 2002

(30) Foreign Application Priority Data

Nov. 21, 2000 (KR) ............................... 2000-69352
Nov. 21, 2000 (KR) ............................... 2000-69353

(51) Int. Cl.
*G11B 7/00* (2006.01)

(52) U.S. Cl. .............. 369/44.32; 369/53.19; 369/53.34; 369/53.18; 369/53.23

(58) Field of Classification Search .............. 369/53.19, 369/53.28, 53.33, 44.32
See application file for complete search history.

(56) References Cited

U.S. PATENT DOCUMENTS

| | | | | |
|---|---|---|---|---|
| 4,631,712 A | * | 12/1986 | Matsubayashi et al. | 369/44.33 |
| 4,712,205 A | * | 12/1987 | Smid et al. | 369/44.12 |
| 5,001,690 A | * | 3/1991 | Kamiya et al. | 369/44.32 |
| 5,107,478 A | * | 4/1992 | Tamaru et al. | 369/44.32 |
| 5,379,282 A | * | 1/1995 | Wachi | 369/44.35 |
| 5,502,698 A | * | 3/1996 | Mochizuki | 369/44.32 |
| 5,583,838 A | * | 12/1996 | Itoh | 369/47.31 |
| 5,627,808 A | * | 5/1997 | Hajjar et al. | 369/44.32 |
| 5,663,942 A | * | 9/1997 | Ishibashi et al. | 369/53.34 |
| 5,682,372 A | * | 10/1997 | Yamakawa et al. | 369/94 |
| 5,805,543 A | * | 9/1998 | Takamine et al. | 369/44.32 |
| 5,808,984 A | * | 9/1998 | Baba | 369/44.32 |

(Continued)

FOREIGN PATENT DOCUMENTS

JP 1-199329 A 8/1989

(Continued)

*Primary Examiner*—Joseph H Feild
*Assistant Examiner*—Peter Vincent Agustin
(74) *Attorney, Agent, or Firm*—Birch, Stewart, Kolasch & Birch, LLP

(57) ABSTRACT

Disclosed is a tilt controlling method and apparatus in which an FE signal track at a point where an RF signal is the maximum or an RE signal track at a point where a jitter is the minimum is detected as a tilt control signal to induct a DC component according to the disk shape and an AC component according to the surface vibration of the disk. Further, the fact is used that an RF envelope has a maximum value when the disk is parallel to an object lens or there is no tilt. Thus, in a tilt initialization step, a tilt track as the RF Max. is obtained for one rotation and the central potential of this track is set as a tilt control reference voltage, and when the RF envelope becomes a phase corresponding to a condition of a controller or a differential value of the RF envelope in the tilt window signal becomes a desired phase, tilt control is started so that the RF envelope always has the maximum value.

9 Claims, 7 Drawing Sheets

U.S. PATENT DOCUMENTS

| | | | |
|---|---|---|---|
| 6,215,747 B1 * | 4/2001 | Jobs | 369/53.24 |
| 6,240,055 B1 * | 5/2001 | Takamine et al. | 369/44.29 |
| 6,256,271 B1 * | 7/2001 | McLeod | 369/44.23 |
| 6,282,161 B1 * | 8/2001 | Son et al. | 369/53.19 |
| 6,295,256 B1 * | 9/2001 | Kimikawa et al. | 369/44.32 |
| 6,452,897 B1 * | 9/2002 | Van Den Enden | 369/275.1 |
| 6,587,409 B1 * | 7/2003 | Yamazaki et al. | 369/44.28 |

FOREIGN PATENT DOCUMENTS

| | | | |
|---|---|---|---|
| JP | 01307933 A | * | 12/1989 |
| JP | 04307431 A | * | 10/1992 |
| JP | 08185636 A | * | 7/1996 |
| JP | 2001023213 A | * | 1/2001 |

* cited by examiner

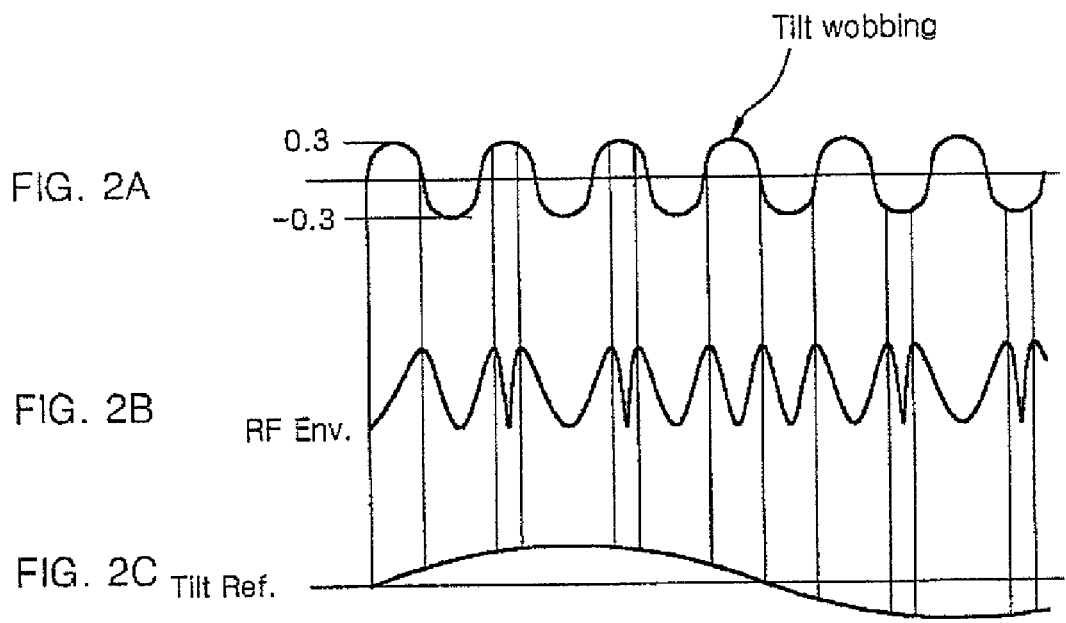
FIG. 2A
FIG. 2B
FIG. 2C
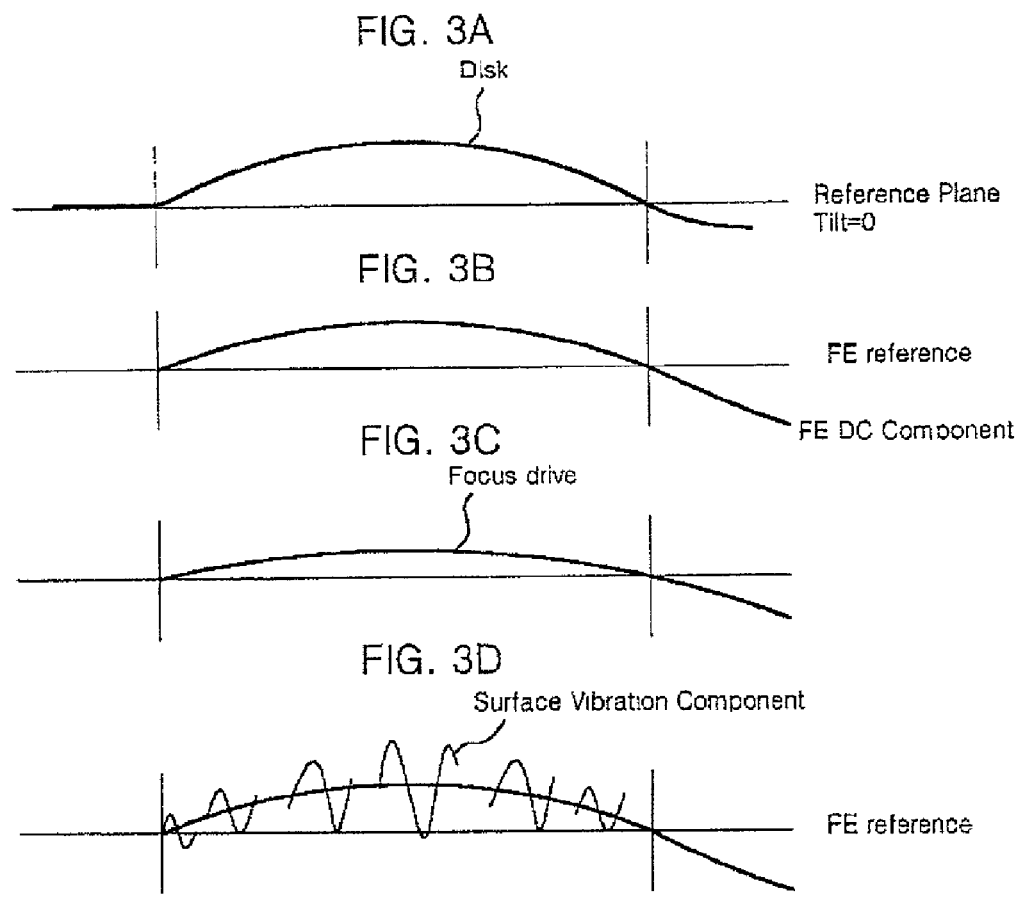
FIG. 3A
FIG. 3B
FIG. 3C
FIG. 3D

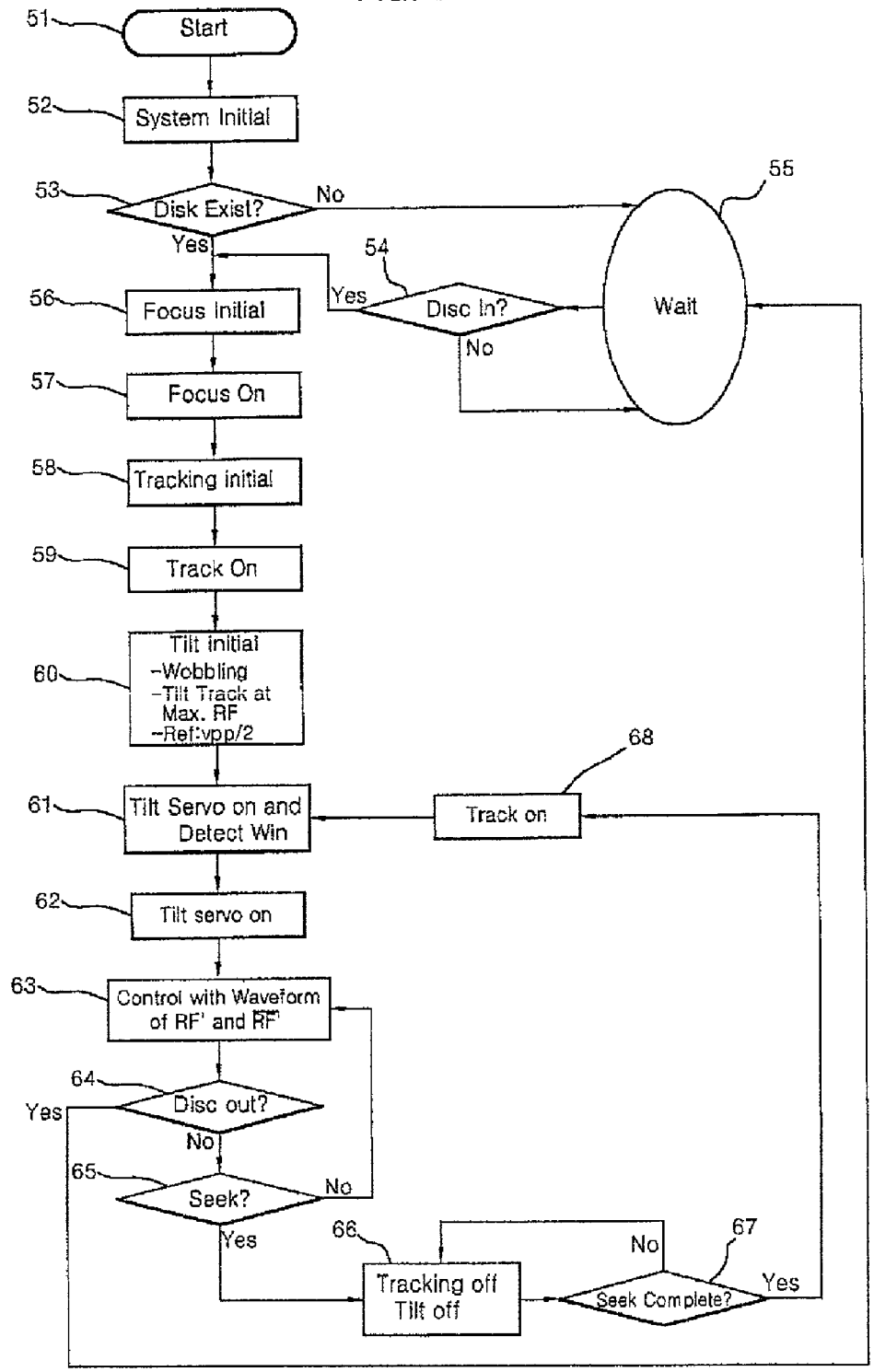

METHOD AND APPARATUS FOR CALCULATING A VARIATION PER TRACK OF A FOCUS ERROR TO CONTROL THE TILT OF A DISK

BACKGROUND OF THE INVENTION

1. Field of the Invention

The present invention relates to a tilt controlling method and apparatus in a high density optical record medium system 2. Description of the Related Art In general, an optical record medium is generally classified according to capability of rewriting into a Read Only Memory (ROM), a WORM which can be recorded once and a rewritable medium which can be repeatedly recorded.

Here, examples of the ROM type optical record medium include a Compact Disk Read Only Memory (CD-ROM), a digital Versatile Disk Read Only Memory (DVD-ROM) and so on. Examples of the WORM type optical record medium include a Recordable Compact Disk (CD-R), Recordable Digital Versatile Disk (DVD-R) and so on. Also, examples of the rewritable optical record medium include a Rewritable Compact Disk (CD-RW), a Rewritable Digital Versatile Disk (DVD-RW, DVD-RAM) and so on.

The foregoing rewritable optical record medium, for example the optical disk, has signal tracks constituted by lands and grooves so that tracking can be controlled even in a blank disk in which information signals are not recorded. Lately, the information signals are recorded in the tracks of the lands and the grooves to raise record density.

Also, a laser beam of an optical pick-up for record/reproduction has a single wavelength, and the opening ratio is enlarged to reduce the size of a light beam for record/reproduction.

Further, the high-density optical disk reduces a distance between signal tracks or a signal track pitch to raise the record density.

In this case, such an optical disk can be distorted during injection and hardening processes of a resin in a manufacture process, and accordingly have the eccentricity and the disk inclination even with a central hole. Further, the tracks of the disk generates the eccentricity caused by declination of the central hole even if they are correctly recorded in a spiral shape with a predetermined pitch. Therefore, the disk rotates with the eccentricity so that the central axis of a motor may hardly align with the center of the tracks.

Therefore, since it is difficult to correctly read a signal of only a desired track, the CD and DVD have standards determined about the variation and executes a tracking servo so that the light beam can always trace the desired track even in the eccentricity.

In other words, the tracking servo generates an electric signal corresponding to a beam trace condition and moves an object lens and an optical pickup body in the radial direction based upon the electric signal to correct the position of the beam thereby enabling correct trace of the track.

Meanwhile, the beam deviates from the corresponding track not only in the foregoing eccentricity of the disk but also in the inclination of the disk, which can take place due to a mechanical problem such as an error in mounting the disk to a spindle motor. In other words, focusing and tracking are deflected without having correct vertical alignment. Such a condition that the disk is inclined is called the tilt.

Such tilt has not been considered as a serious problem in the CD having a large tilt margin due to a wide track pitch.

Here, the tilt margin means the magnitude in which compensation can be made even if the disk is inclined at a certain degree.

However, the DVD has a narrow track pitch due to high density and thus a small tilt margin so that the beam influences the next track even if the tilt takes place in a small amount or the disk is slightly inclined. In this case, the tracking servo is not sufficient to compensate the tilt.

In other words, when the light beam crosses over the adjacent track, it will be judged that the tracking servo incorrectly traces the track even if the focus of the object lens is at the center of the tracks.

In this case, data cannot be read correctly in reproduction or correctly written in the corresponding track in record so that dual distortion takes place in reproduction of the data written in this fashion.

Therefore, as a method to solve such a tilt problem, a dedicated tilt sensor or a tilt-dedicated light receiving device is additionally provided to detect the tilt of the disk.

However, such a method has a problem that efficiency is lowered and the size of a set increases.

A rewritable data zone of the DVD-RAM has head fields, and each of the head fields has a Variable Frequency Oscillator (VFO) area for generating a reference clock for adjusting a bit synchronization of a lead channel, in which the size of a signal or a tracking error signal is detected from the VFO area to control the tilt. However, the tilt cannot be detected if each sector of the data zone does not have a head.

SUMMARY OF THE INVENTION

According to an embodiment of the invention to obtain the object, it is provided a tilt controlling method comprising the following steps of: detecting a track of a focus error for maximizing an RF or minimizing a jitter as a focus is on; detecting the maximum value and the minimum value of the focus error; and calculating a variation per track of the focus error to control the tilt using the variation.

The method further comprises the step of calculating a variation per track of the maximum value and the minimum value of the focus error to detect a normalized DC component.

It is preferred that a tilt reference is varied as much as the variation per track to control the tilt.

The method further comprises the step of detecting a DC component using the maximum value and the minimum value of the focus error to control the tilt, wherein the maximum value and the minimum value of the focus error can be applied separately or at the same time.

It is preferred that said step of calculating a variation per track of the focus error to control the tilt using the variation comprises the steps of: calculating the variation per track of the focus error; detecting a surface vibration from the trembling of the disk; and normalizing the variation per track of the focus error and the surface vibration to control the tilt.

It is preferred that a normalized value and a reference value due to tilt initialization are considered to control the tilt, and the reference value due to tilt initialization is obtained from an FE track at a point where an RF envelope peak has the maximum value or a jitter has the minimum value.

Also, it is preferred that a normalized value is proportional to time in the case of constant linear velocity, and a normalized value is proportional to length in the case of constant angular velocity.

According to another embodiment of the invention to obtain the object, it is provided a tilt controlling method comprising the following steps of: wobbling a tilt driving block at a certain frequency; obtaining an FE track at a point where an RF signal has the maximum value; and normalizing the detected FE track.

According to further another embodiment of the invention to obtain the object, it is provided a tilt controlling apparatus of a optical record medium, comprising: an RF and servo error producing unit for producing RF and servo error signals from an electric signal outputted from an optical pickup unit; a servo controlling unit having a tilt error detecting and controlling block for receiving RF and focus error signals outputted from said RF and servo error producing block to produce DC and AC values about the tilt initialization and an optical disk; and a servo driving unit for controlling said optical pick-up unit in response to a signal of said servo controlling unit.

It is preferred that said tilt error detecting and controlling block includes: an RF peak detecting block for detecting the peak of an RF envelope; a detecting block for detecting the maximum and minimum values of a focus error per one rotation of a disk; and a tilt controlling block for controlling the tilt using the RF signal and an FE signal.

The method further comprises the following steps of: wobbling a tilt driving unit at a certain frequency as a focus servo and a tracking servo are on; and detecting a reference voltage of a tilt drive control track at the peak of an RF envelope.

According to still another embodiment of the invention to obtain the object, it is provided a tilt controlling method, comprising the following steps of: wobbling a tilt driving unit at a certain frequency; detecting an envelope value of an RF high-frequency signal outputted from an optical pick-up; obtaining a tilt control track at a point where the envelope value of the RF high-frequency signal has the maximum value to adjust an offset of a tilt controller for initialization; and generating a signal for operating a tilt servo to control the tilt.

In setting the tilt control track, a point where the envelope value of the RF high-frequency signal is rotated for at least one time to average the maximum/minimum values of the tilt control quantity.

It is preferred that the tilt is controlled in such a direction that an RF envelope value has the maximum value, and the direction of tilt control is determined according to a differential value at each point of the RF envelope so that the RF envelope has the maximum value.

It is also preferred that a quantity of the tilt control is determined according to a differential value at each point of the RF envelope so that the RF envelope has the maximum value.

Also it is preferred that the RF envelope is controlled to have plus phase, wherein a control phase is minus when the RF envelope has the maximum value, and the control phase is plus when the RF envelope has the minimum value.

According to other embodiment of the invention to obtain the object, it is provided a tilt controlling apparatus comprising: an RF producing unit for producing an RF signal from an electric signal outputted from an optical pick-up; an RF envelope detecting unit for detecting an envelope of the RF signal; a peak window unit for outputting a window signal when the RF envelope has the maximum value; and a servo control means having a differentiator for differentiating the detected RF envelope value to provide a controlling direction of the tilt and a tilt controller for controlling a tilt controlling unit in response to signals from said differentiator and said window unit.

BRIEF DESCRIPTION OF THE DRAWINGS

In the drawings:

FIGS. 2A to 2C show a tilt control waveform for tilt wobbling, a RF envelope waveform and a waveform of the quantity of control necessary for tilt control of one cycle;

FIGS. 3A to 3D show track waveforms of FE signals according to tilt values;

FIG. 9 is a detailed flow chair of tilt control using the RF signal according to the invention.

DETAILED DESCRIPTION OF THE PREFERRED EMBODIMENT

Hereinafter detailed description of a preferred embodiment of the invention will be made in reference to the accompanying drawings.

According to the present invention, first, the track center of an FE signal per one disk rotation at a point where a RF signal is the maximum or the track center of a FE signal at a point where the jitter per one disk rotation is the minimum is set as a tilt control reference to induct a DC component according to the disk shape and an AC component according to surface vibration of the disk to set the quantity of tilt control. Then, the tilt is compensated as the set tilt control quantity according to disk conditions in operating the disk followed by record/reproduction.

Figure 1:
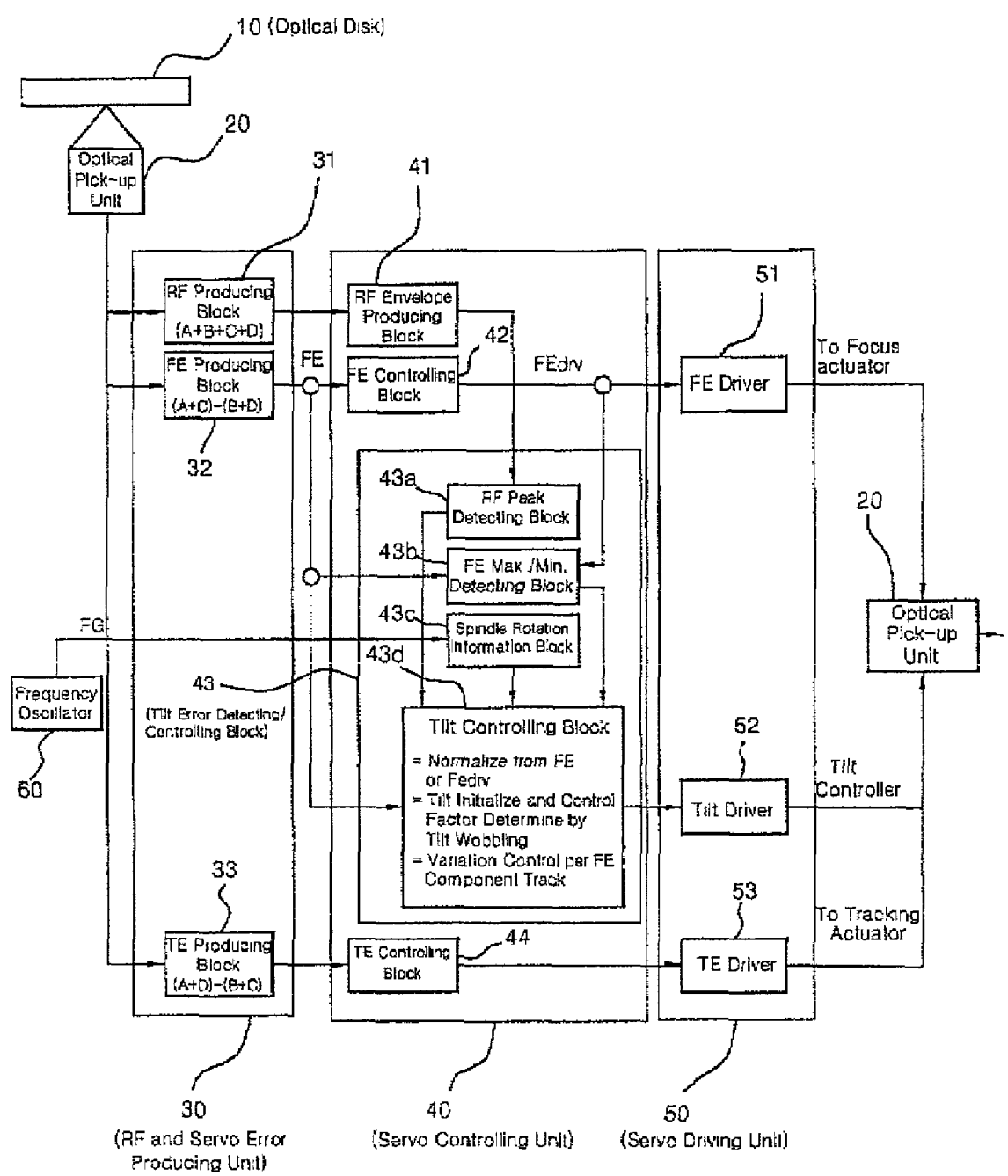
FIG. 1 is a block diagram of a tilt controlling apparatus using a FE signal according to the invention.

FIG. 1 is a block diagram of a tilt controlling apparatus using the FE signal according to the invention.

Referring to FIG. 1, the tilt controlling apparatus comprises an optical disk 10 capable of rewriting data, an optical pick-up unit 20 for recording and reproducing information to the optical disk 10, a servo error producing unit 30 for producing RF and servo error signals from electric signals outputted from the optical pick-up unit 20, a servo controlling unit 40 for respectively treating a Focus Error (FE) signal and a Tracking Error (TE) signal detected in the RF and servo error producing unit 30 to generate a focus driving signal and tracking drive signal and for generating a tilt driving signal for control of the tilt using the peak of an RF envelope as the maximum value of the RF signal and the FE signal, and a servo driving unit 50 for controlling the optical pick-up unit 20 according to the signal from the servo controlling unit 40.

The RF and servo generating unit 30 includes an RF producing block 31 for collecting four electric signals (a+b+c+d)

which are division-converted from an optical beam reflected from an optical record medium (optical disk) by an photodetector (not shown) to produce the RF signal, an FE producing unit 32 for producing the FE signal from the electric signals through astigmatism {(a+c)-(b+d)}, and a tracking error producing block 33 for producing the tracking error through push-pull.

The servo controlling unit 40 includes an RF envelope producing block 41 for producing the RF envelope of the RF signal, a focus error controlling block 42 for controlling the focus error according to the produced focus error value, a tilt error detecting/controlling block 43 for outputting a control signal to a tilt driver 52 for controlling the tilt using outputs of the RF envelope producing block 41 and the focus error controlling block 42 and a TE controlling block 44 for controlling the tracking error according to the value of the tracking error.

The tilt error detecting/controlling block 43 includes an RF peak detecting block 43a for detecting the RF peak from the RF envelope signal, an FE Max./Min. detecting block 43b for detecting the maximum and minimum values in the FE signal produced from the focus error producing block 32, a spindle rotation information block 43c capable of obtaining a spindle rotation velocity according to information of a frequency oscillator 60, and a tilt controlling block 43d for outputting the tilt control signal to the tilt driver 52 according to the FE values and signals from the RF peak detecting block 43a, the FE Max./Min. detecting block 43b and the spindle rotation information block 43c.

The servo driving unit 50 receives each signal to control the tilt and an actuator in the optical pick-up unit 20, and also includes a focus driver 51, the tilt driver 52 and a tracking driver 53.

FIGS. 2A to 2C respectively show a tilt control waveform for tilt wobbling, an RF envelope waveform and a waveform of the quantity of control necessary for tilt control of one cycle.

In other words, the waveforms depict processes of tilt control initialization for controlling the tilt when a system is installed or driving is newly started.

In the initialization, a tilt initializing process is executed after a focus servo and a tracking servo are stabilized. In this case, when the disk as a record medium and an objective lens are aligned without being mutually tilted, the RF reflected from the disk has the maximum level.

In other words, when the disk is mounted without the surface vibration factor and the tilt is zero, the RF has the maximum value, the envelope value of the RF is increased or decreased as the tilt value. In driving the disk, when the focus and tracking servos are on, the tilt controller 15b wobbles the tilt driving block 16 in a certain frequency so that the track of the tilt driving control wobbled at the peak point of the RF envelope can be rotated for one or several times.

The centric voltage of the track during one rotation is detected to adjust options about a tilt error.

The track of the EE signal is obtained at a point where the RF bright envelope is the maximum (FIG. 2B) while the tilt controlling unit 43d is uniformly wobbled about a reference point or center after the focus and tracking of the optical disk 10 are initialized and then the focus and tracking are on (FIG. 2A). The track can be replaced with a tilt error for tilt control of the optical disk, and accordingly the tilt can be controlled through the tilt controlling unit with the center as a tilt controlling reference voltage (FIG. 2C).

Meanwhile, the jitter features of the optical disk 10 are considered to obtain the track of the FE signal at the minimum value of the jitter so that tilt control can be performed in the foregoing fashion.

FIG. 3 shows the quantities of tilt according to conditions of the optical disk 10, in which compensation is made according to each reference value to control the tilt.

FIG. 3A shows the tilted shape of the optical disk, which takes place in mounting the optical disk or by self-tilt of the disk.

FIG. 3B shows an FE DC component by tilt which is detected by calculating variation per track of peak-to-peak values of the FE according to the tilt of the disk. In this case, the maximum or minimum of the peak-to-peak values of the FE can be used in detecting the DC component. Alternatively, both of the maximum and minimum values can be used.

The DC component is a very low frequency which is detected while being moved in the radial direction of the optical disk, and the DC or tilt reference is varied as much as this variation to control tilt.

FIG. 3C is a waveform of a focus drive about the focus error in FIG. 3B.

FIG. 3D shows a waveform by surface vibration according to the tilt of the optical disk shown in FIG. 3A.

Figure 4:
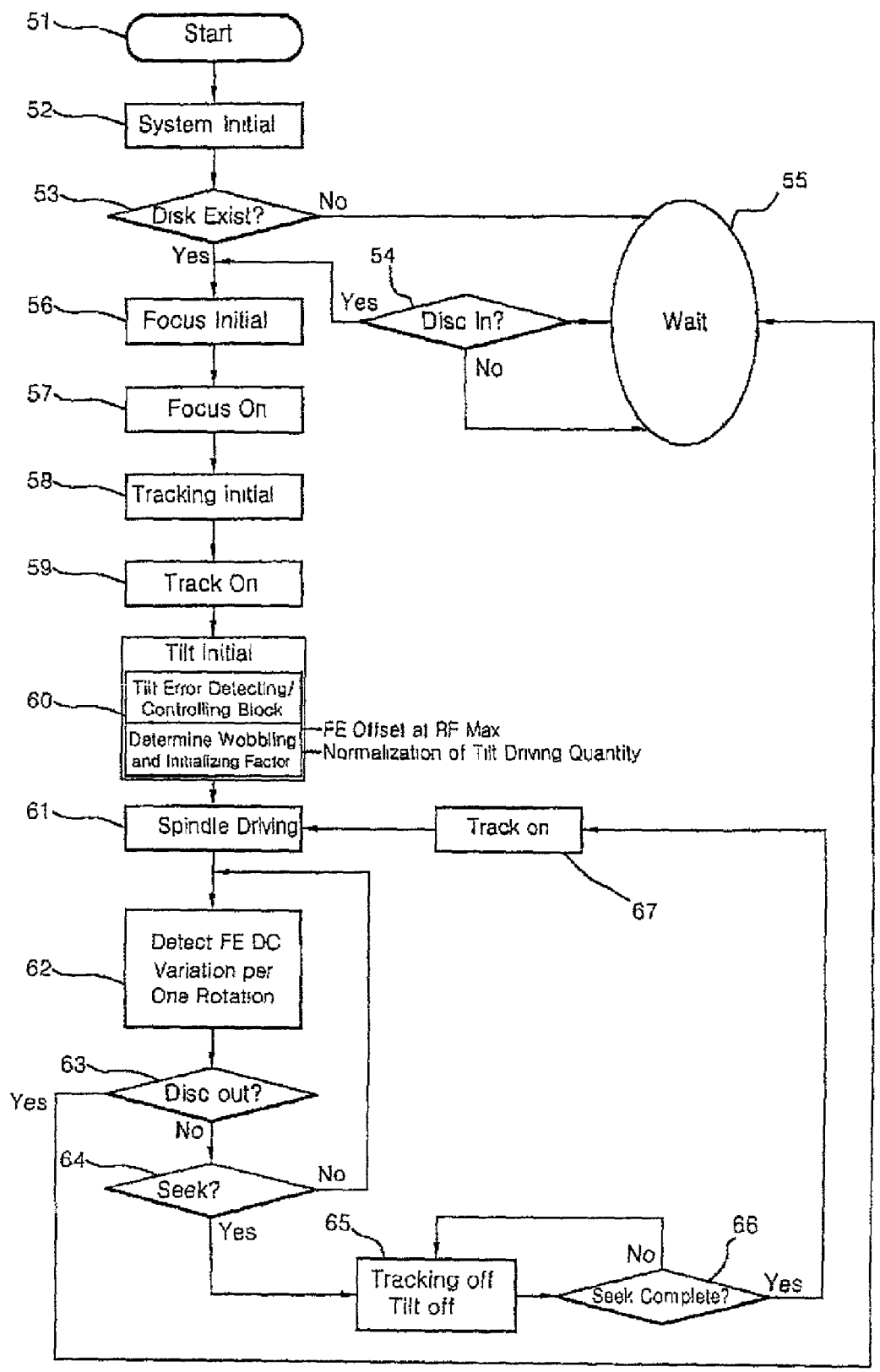
FIG. 4 is a detailed flow chart of tilt control using a FE signal of the invention.

FIG. 4 is a detailed flow chart of tilt control using the FE signal according to the invention, by which description will be made as follows:

Power is applied to an optical record medium system (DVD) to operate the system and a step of initialization is executed (steps 51 and 52).

In other words, a system controller initializes each component to be suitable to the system in response to reset of the controller as power is supplied, executes operations according to a firmware (F/W) realized in the controller, and cancels an offset of each servo channel according to the initial reference necessary for the servos at the initial stage.

Then, an initializing element is initialized without input of the RF signal. For example, initial diagnosis of the system is performed, i.e., factors about a sled movement is initialized or the object lens is positioned at the initializing position.

Then, the optical pick-up unit 20 carries out focusing to judge existence and type of the disk, and selects laser power of a laser diode and a focus servo controller in an optical pick-up unit according to disk type to perform the focus servo. When disk judgment is completed, an initializing value of each component of the system is changed and set according to the judged disk.

If it is judged that there is no disk, execution is delayed until the disk is inserted (steps 53, 54 and 55).

The initialization related to the focus and the focus are on in execution of the focus servo. At this time, a focus option and a focus balance are carried out to stabilize the focus servo (Steps 56 and 57).

After the focus servo is stabilized, the tracking is initialized and on, in which a tracking option, a balance and so on are carried out to stabilize the tracking servo (Step 58 and 59).

After the focus servo and the tracking servo are stabilized, steps of initializing the tilt are executed.

In other words, the track of the FE signal is obtained at the point with the maximum of the RF envelope signal (refer to FIG. 2C and 43a in FIG. 1) while the tilt controlling block is tilt wobbled according to a certain reference level (refer to FIG. 2A). Then, the track of the FE signal can be replaced by the tilt error for tilt control of the optical disk and a driving quantity for controlling the tilt can be inducted by detecting an offset about the tilt error. Also, the normalization or mean value of the tilt error is determined as a tilt controlling reference or a factor for controlling the tilt (step 60, refer to 43a, 43b and 43d in FIG. 1).

Further, the tilt controlling factor can be also determined as a point with the maximum of the RF peak envelope or the minimum of the jitter in the case of the record disk.

A spindle motor for rotating the optical disk is operated to detect FE DC variation per one rotation as variation per track by the optical disk tilt by using the initializing value determined in step 60, the FE AC variation by surface vibration of the optical disk is inducted to normalize the FE or an FE drive and the tilt of the optical disk is controlled as much as an offset component thereof through the tilt driver (steps 61 and 62, FIGS. 3A to 3D)

The normalizing or mean value component is proportional or corresponds to a one rotation time period in the case of Constant Linear Velocity (CLV) rotation, and to one rotation length in the case of Constant Angle Velocity (CAV).

In the case of seeking, after the tilt and tracking servos are off and a sled is moved up to a desired point, the tilt and tracking servos can be on (steps 64 to 67).

In this way, a normal servo is always controlled in a direction with the maximum of the RF envelope since the RF is the maximum when the servo is not tilted.

As shown in the above according to the invention, the focus error variation about a radial movement component or variation per track is the same as the tilt error variation so that the DC component by the disk shape and the AC component by the surface vibration of the disk are respectively inducted with the center as a tilt controlling reference voltage so that the tilt can be respectively applied to the DC component or the AC component or coincidently applied to the DC and AC components to control the tilt.

According to the tilt controlling method and apparatus of the invention as shown above, when the focus and tracking servos are on in the initial stage that the optical disk is mounted or the optical disk record/reproduction device is on, the focus error variation about the radial movement component or variation per track. Thus, the DC component by the disk shape and the AC component by the surface vibration of the disk are inducted to respectively apply the tilt to the DC component and/or the AC component with the centers of the components as the tilt controlling reference voltage so that the tilt can be compensated. Then, the tilt can be detected and compensated in a stable and correct fashion without using a separate light receiving element in a high-density optical disk.

Figure 5:
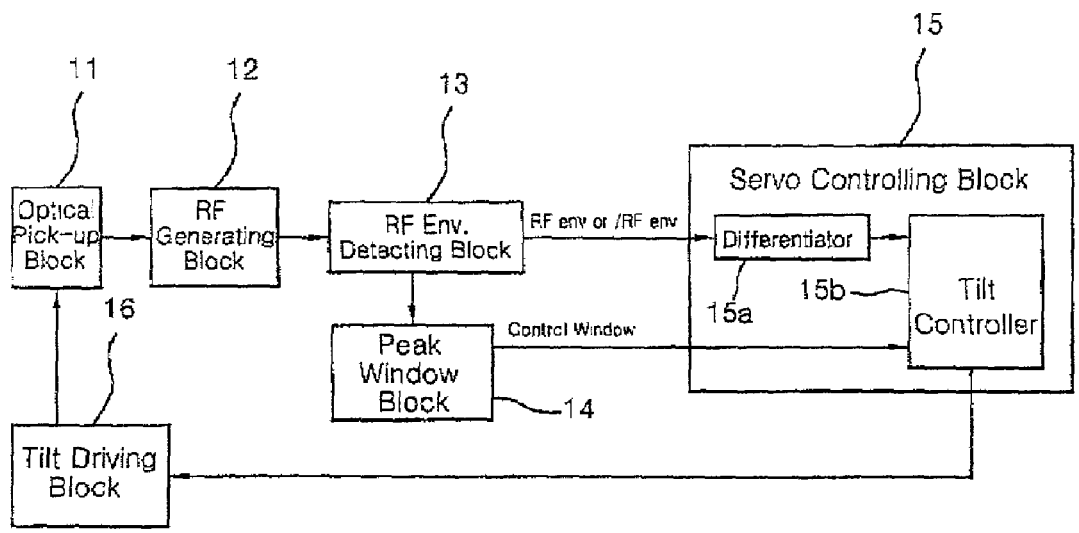
FIG. 5 is a block diagram of a tilt control apparatus using a RF signal of the invention.

FIG. 5 is a block diagram of the tilt controlling apparatus using the RF signal according to the invention.

Referring to FIG. 5, the tilt controlling apparatus comprises an optical pick-up block 11 for recording and reproducing information into/from the optical disk, an RF producing block 12 for producing an RF high-frequency signal from an electric signal from the optical pick-up block 11, an RF envelope detecting block 13 for detecting an envelope of the RF signal, a peak window block 14 for outputting a control window signal when the value of the RF signal is the maximum, a servo controlling block 15 for generating a signal for controlling a servo of an optical system using the detected RF envelope (RF env.), a reverse RF envelope (/RF env.) and the control window signal from the peak window block 14, and a tilt driving block 16 for controlling the optical pick-up according to a driving signal from the servo controlling block 15 to control the tilt.

The servo controller 15 is constituted by a differentiator 15a for differentiate the RF envelope (RF env.) and the reverse RF envelope (/RF env.) to be used in a direction of controlling the tilt, and a tilt controller 15b for controlling the tilt driving block 16 in response to the differentiator 15a and the control window of the peak window block 14.

FIGS. 6A to 6D show waveforms operated in FIG. 5.

Figure 6:
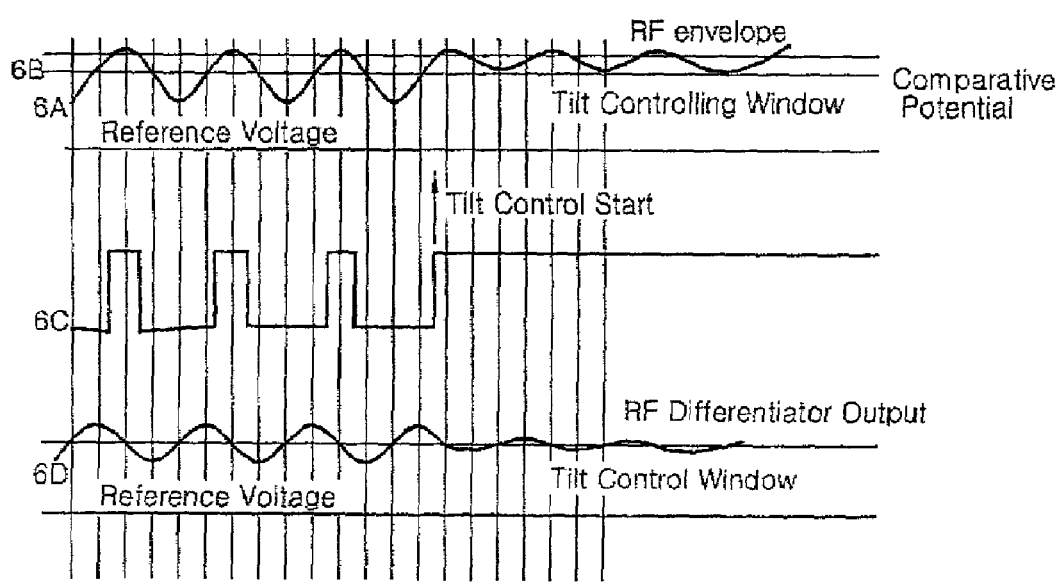
FIG. 6A is a waveform for showing the envelope value of a RF signal produced by an optical pick-up unit.
FIG. 6B shows a comparative potential for generating a control window from RF envelope.
FIG. 6C is a waveform for showing a time point for generating a control window signal for starting tilt control when the RF envelope value is at least the comparative potential.
FIG. 6D is a waveform for showing a direction for controlling the tilt, which is outputted by a differentiator from the RF envelope value in FIG. 6A.

FIG. 6A shows a waveform of an envelope value of the RF produced by the optical pick-up block 11 when the tilt controller 15b wobbles the tilt driving block 16 in a certain frequency and an RF envelope waveform when a control window signal is generated for controlling the tilt when the RF has the maximum value.

FIG. 6B shows a comparative potential for generating the control window from the RF Env.

FIG. 6C shows a binary phase clock compared to the comparative potential of the RF envelope value shown in FIG. 6A, in which indicated is a time point for generating the control window signal for starting tilt control when the RF Env. value is at least the comparative voltage.

In FIG. 6C, the minus phase of a differential signal in tilt control is the optimal tilt control phase.

FIG. 6D is a waveform for showing direction and control quantity for controlling the tilt in the waveform outputted by the differentiator 15a.

In FIG. 6D, the minus phase of the differential signal in tilt control is the optimal tilt control phase.

Figure 7A:
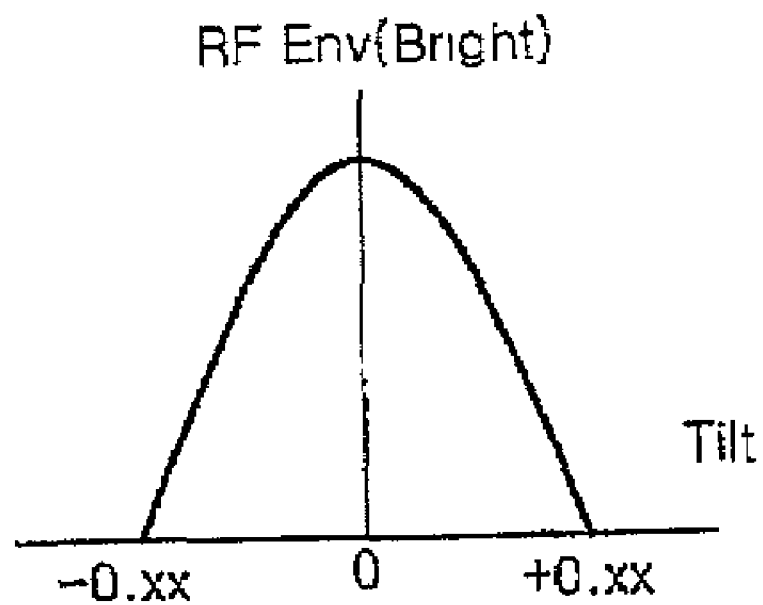
FIG. 7A is a waveform for showing the envelope value of the RF value according to each tilt.
Figure 7B:
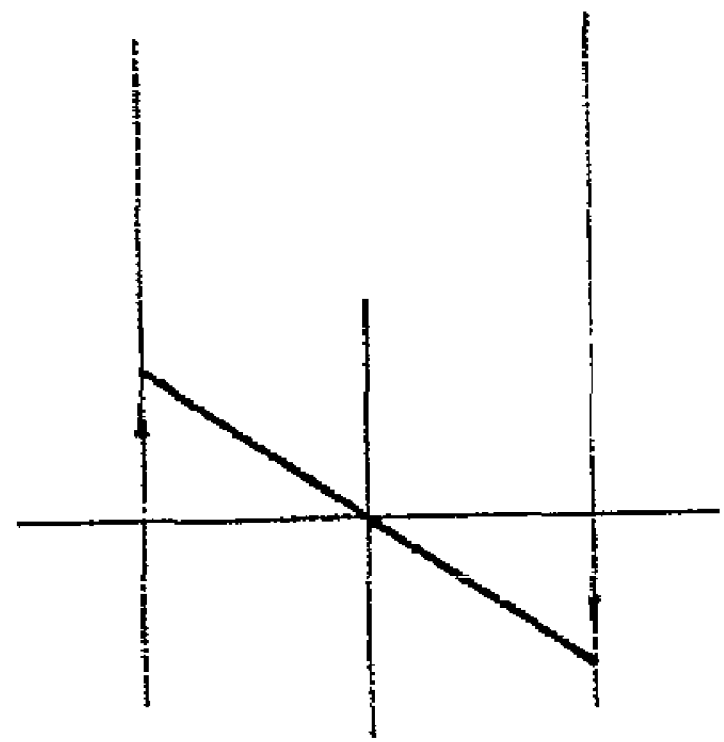
FIG. 7B is a graph for showing the value differentiated by the differentiator from the RF envelope value according to the tilt in FIG. 7A and the tilt controlling direction.

FIGS. 7A and 7B are differential values for showing the variation of the plus RF envelope value according to the tilt size and the control quantity and the control direction according to each tilt by the differentiator about the RF value. The RF value is produced by reflection from the optical disk through driving the focus actuator (not shown) in the optical pick-up unit 11 by the focus driving unit (not shown) under the control of the servo controlling unit 15.

FIG. 7A shows the plus envelope value of the RF according to each tilt, in which the tilt is made into the plus or minus direction about the maximum point of the RF envelope to decrease the RF envelope.

FIG. 7B shows an RF envelope value according to the tilt in FIG. 7A, in which the RF envelope decreases according to the quantity of tilt.

In other words, the RF envelope decreases as the disk is inclined from zero as the center of the disk tilt, and the differential value of the RF envelope is a signal having tilt information.

Figure 8A:
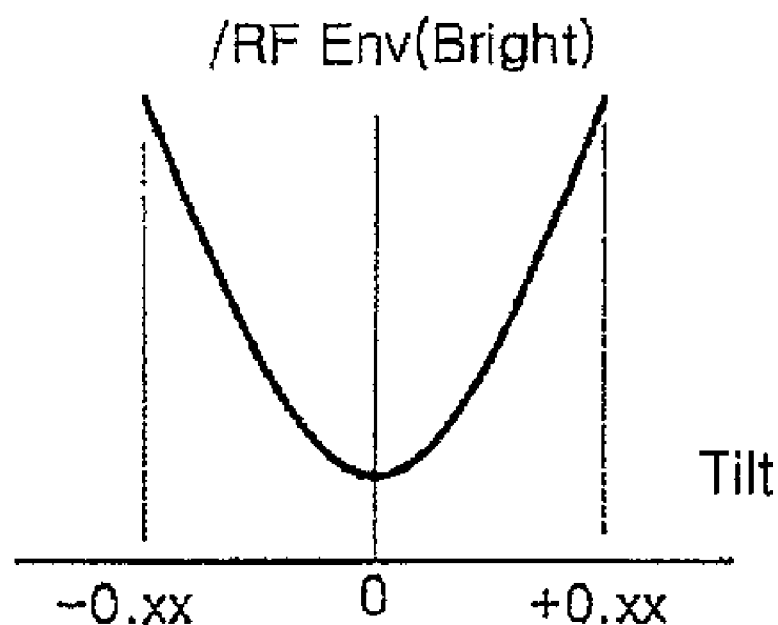
FIG. 8 is a reverse phase graph of FIGS. 7A and 7B.
Figure 8B:
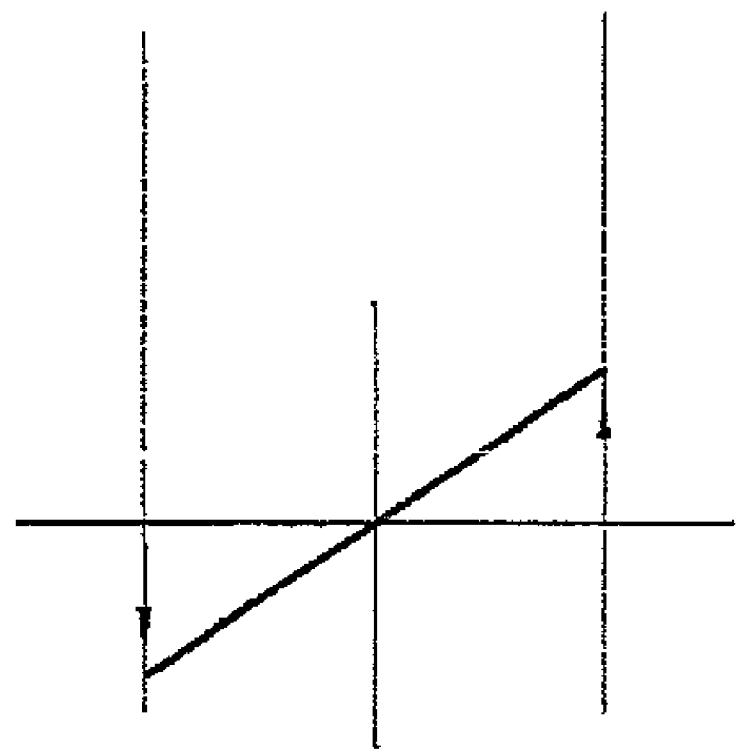

FIG. 8 is the reverse phase of FIG. 7 for showing a differential value for indicating the control quantity and the control direction according to the tilt value and the variation of the plus RF envelope value having the minimum value according to the tilt size.

FIG. 9 shows a detailed flow chart using the RF signal according to the invention.

Description will be made about the tilt controlling method using the RF signal in reference to the foregoing drawings:

First, power is supplied to the optical record medium system (DVD) to operate the system, and a step of initializing is proceeded (steps 51 and 52).

In other words, the system controller initializes each component to be suitable to the system in response to reset of the controller as power is supplied, executes operations according to the firmware (F/W) realized in the controller, and cancels the offset of each servo channel according to initial reference necessary for the servos at the initial stage.

Then, an initializing element is initialized without input of the RF signal. For example, initial diagnosis of the system is performed, i.e., factors about a sled movement is initialized or the object lens is positioned at the initializing position.

Then, the optical pick-up unit 11 carries out focusing to judge existence and type of the disk, and selects laser power of a laser diode and a focus servo controller in an optical pick-up unit according to disk type to perform the focus servo. When disk judgment is completed, an initializing value of each component of the system is changed and set according to the judged disk.

If it is judged that there is no disk, execution is delayed until the disk is inserted (steps 53, 54 and 55).

The initialization related to the focus and the focus are on in execution of the focus servo. At this time, a focus option and a focus balance are carried out to stabilize the focus servo (steps 56 and 57).

After the focus servo is stabilized, the tracking is initialized and on, in which a tracking option, a balance and so on are carried out to stabilize the tracking servo (step 58 and 59).

After the focus servo and the tracking servo are stabilized, steps of initializing the tilt are proceeded. In this case, if the disk as a record medium and the object lens in the optical pick-up unit are aligned without mutual inclination, the RF level reflected from the disk is the maximum.

In other words, when the disk is mounted without the surface vibration factor and the tilt is zero, the RF has the maximum value, the envelope value of the RF is increased or decreased as the tilt value. In driving the disk, when the focus and tracking servos are on, the tilt controller 15b wobbles the tilt driving block 16 in a certain frequency so that the track of the tilt driving control wobbled at the peak point of the RF envelope can be rotated for one or several times.

During this one rotation, a central voltage is detected to adjust the offset about the tilt error (steps 60, FIGS. 7 and 8).

The tilt wobbling is applied to output the control window signal for controlling the tilt controlling block (FIG. 6C) from the peak window block 14 (FIG. 1) at the point where the RF has the maximum value, and accordingly the tilt controlling block 15b turns on the tilt servo for operating the tilt driving block 16 (steps 61 and 62).

Therefore, the tilt is controlled in which the control quantity and the control direction are the waveform in FIG. 6D differentiated from the RF envelope value in FIG. 6A. To be specific, as shown in FIG. 7, when the RF envelope has the maximum value, the control phase is the minus phase of the value differentiated from the RF envelope value.

In other, control is made so that the RF envelope differential value becomes zero. Also, as shown in FIG. 8, when control is made as the reverse phase of the RF envelope, the control phase is the plus phase of the value differentiated from the reverse RF envelope (step 63).

In the case of seeking, the tilt and tracking servos are off and the sled is moved up to a desired position, and the tilt and the tracking servos can be 'on' (steps 65 to 68).

In this way, the normal servo is controlled in a direction where the RF envelope is always the maximum. Then, when the driving of the disk is completed, the tilt initialization is executed again as the tracking servo and the focusing servo are on.

As shown above according to the invention, in driving the disk, as the focusing and tracking servos are on, the tilt controlling unit wobbles the tilt driving unit at a certain frequency to obtain the tilt track at least one cycle or rotation at the point where the RF value is the maximum for initializing the tilt controller. The envelope value is detected and differentiated to determine the control quantity and the control direction of the tilt.

Here, at the tilt controlling point, the tilt wobbling method is applied in such a manner that the peak window unit outputs the control window signal for controlling the tilt to the tilt controlling unit when the RF has the maximum value.

According to the invention as described hereinbefore, in driving the disk, as the focusing and tracking servos are on, the tilt controlling unit wobbles the tilt driving unit at a certain frequency to obtain the tilt track at least one cycle or rotation at the point where the RF value is the maximum for initializing the tilt controller. The envelope value is detected and differentiated to determine the control quantity and the control direction of the tilt. Accordingly, the tilt can be detected and controlled in a stable and correct fashion without using a separate light receiving device in the high-density optical disk.

What is claimed is:

1. A tilt controlling method comprising the steps of:
   detecting a trace of a focus error at the maximum value of an RF signal or at the minimum value of jitter when a focus is on;
   detecting the maximum value and the minimum value of the focus error; and
   calculating a variation per physical track of the focus error by using the maximum and minimum values of the focus error to control the tilt using the variation.

2. The tilt controlling method according to claim 1, further comprising the step of calculating a variation per physical track of the maximum value and the minimum value of the focus error to detect a normalized DC component.

3. The tilt controlling method according to claim 2, wherein a tilt reference is varied as much as the variation per physical track to control the tilt.

4. The tilt controlling method according to claim 1, wherein said step of calculating a variation per physical track of the focus error to control the tilt using the variation comprises the steps of:
   calculating the variation per physical track of the focus error;
   detecting a surface vibration from trembling of a disk; and
   normalizing the variation per physical track of the focus error and the surface vibration to control the tilt.

5. The tilt controlling method according to claim 4, wherein a normalized value and a reference value due to tilt initialization are considered to control the tilt.

6. The tilt controlling method according to claim 5, wherein the reference value due to tilt initialization is obtained from an FE trace at a point re an RF envelope peak has the maximum value or a jitter has the minimum value.

7. The tilt controlling method according to claim 4, wherein a normalized value is proportional to time in a case of constant linear velocity.

8. The tilt controlling method according to claim 4, wherein a normalized value is proportional to length in a case of constant angular velocity.

9. A tilt controlling apparatus of an optical record medium, comprising:
   a RF and servo error producing unit for producing RF and servo error signals from an electric signal outputted from en optical pickup unit;
   a servo controlling unit having a tilt error detecting and controlling block for receiving RF and focus error signals outputted from said RF and servo error producing unit to produce DC and AC values about a tilt initialization and about an optical disk; and a servo driving unit for controlling said optical pick-up unit in response to a signal of said servo controlling unit, wherein said tilt error detecting and controlling block includes:

a RF peak detecting block for detecting the peak of an RF envelope;

a detecting block for detecting the maximum and minimum values of a focus error per one rotation of a disk; and a tilt controlling block for controlling the tilt using the RF signal and an FE signal calculated by using the maximum and minimum values of the focus error.

* * * * *